US011430614B2

(12) United States Patent
Ishida et al.

(10) Patent No.: US 11,430,614 B2
(45) Date of Patent: Aug. 30, 2022

(54) MODIFIED ACTIVATED CARBON AND METHOD FOR PRODUCING SAME

(71) Applicant: KURARAY CO., LTD., Kurashiki (JP)

(72) Inventors: Shuichi Ishida, Bizen (JP); Keita Takahashi, Bizen (JP); Hiroaki Kitatomi, Bizen (JP); Akinori Yamabata, Bizen (JP); Yasuyuki Hirota, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 223 days.

(21) Appl. No.: 16/612,204

(22) PCT Filed: May 8, 2018

(86) PCT No.: PCT/JP2018/017749
§ 371 (c)(1),
(2) Date: Nov. 8, 2019

(87) PCT Pub. No.: WO2018/207769
PCT Pub. Date: Nov. 15, 2018

(65) Prior Publication Data
US 2021/0050160 A1     Feb. 18, 2021

(30) Foreign Application Priority Data
May 10, 2017  (JP) ............................. JP2017-094096

(51) Int. Cl.
*C01B 32/318*     (2017.01)
*C01B 32/378*     (2017.01)
(Continued)

(52) U.S. Cl.
CPC ........... *H01G 11/34* (2013.01); *C01B 32/318* (2017.08); *C01B 32/378* (2017.08);
(Continued)

(58) Field of Classification Search
CPC ........ H01G 11/34; H01G 11/86; H01G 11/24; C01B 32/318; C01B 32/378;
(Continued)

(56) References Cited

U.S. PATENT DOCUMENTS

2002/0114126 A1   8/2002  Hirahara et al.
2004/0160728 A1*  8/2004  Oyama ................. H01M 4/583
                                                        361/502
(Continued)

FOREIGN PATENT DOCUMENTS

JP     2002-33249 A     1/2002
JP     2002-338222 A    11/2002
(Continued)

OTHER PUBLICATIONS

Extended European Search Report dated Jan. 21, 2021 in European Patent Application No. 18797652.7, 7 pages.
(Continued)

*Primary Examiner* — Richard M Rump
(74) *Attorney, Agent, or Firm* — Oblon, McClelland, Maier & Neustadt, L.L.P.

(57) ABSTRACT

The present invention relates to a coconut shell-derived modified activated carbon having a BET specific surface area of 1400 to 2000 m²/g, a value of hydrogen content/carbon content of 0.0015 to 0.0055, and intra-skeletal oxygen of 0.9 mass % or less.

15 Claims, 3 Drawing Sheets

(51) Int. Cl.
    *C01B 32/384*      (2017.01)
    *H01G 11/34*      (2013.01)
    *H01G 11/86*      (2013.01)

(52) U.S. Cl.
    CPC ........... *C01B 32/384* (2017.08); *H01G 11/86* (2013.01); *C01P 2004/61* (2013.01); *C01P 2006/12* (2013.01); *C01P 2006/40* (2013.01)

(58) Field of Classification Search
    CPC ... C01B 32/384; C01B 32/336; C01B 32/354; C01P 2004/61; C01P 2006/12; C01P 2006/40; C01P 2004/51; C01P 2006/80
    See application file for complete search history.

(56) References Cited

U.S. PATENT DOCUMENTS

| | | | |
|---|---|---|---|
| 2006/0240979 A1 | 10/2006 | Hirahara et al. | |
| 2012/0177923 A1* | 7/2012 | Kumara | C01B 32/336 428/402 |
| 2015/0062778 A1 | 3/2015 | Gadkaree et al. | |
| 2016/0172122 A1 | 6/2016 | Kumar et al. | |
| 2016/0225540 A1 | 8/2016 | Gadkaree et al. | |
| 2017/0092441 A1 | 3/2017 | Gadkaree et al. | |
| 2017/0229708 A1 | 8/2017 | Sonobe et al. | |
| 2019/0295782 A1* | 9/2019 | Kobayashi | H01G 11/34 |

FOREIGN PATENT DOCUMENTS

| | | | |
|---|---|---|---|
| JP | 2004-67498 | 3/2004 | |
| JP | WO 2008/053919 A1 | 5/2008 | |
| JP | 2011-176043 A | 9/2011 | |
| JP | 4796769 B2 | 10/2011 | |
| JP | 5027849 B2 | 9/2012 | |
| JP | WO 2016/021736 A1 | 2/2016 | |
| JP | 2016-201417 A | 12/2016 | |
| WO | WO 2016/123271 A1 | 8/2016 | |
| WO | WO-2017199686 A1 * | 11/2017 | ........... C01B 32/318 |

OTHER PUBLICATIONS

International Search Report dated Aug. 7, 2018 in PCT/JP2018/017749, 2 pages.

English translation of the International Preliminary Report on Patentability dated Nov. 21, 2018 in PCT/JP2018/017749 filed May 8, 2018, 11 pages.

Liqiang Zhang, et al., "Modification of Activated Carbon Using Microwave Radiation and Its Effects on the Adsorption of $SO_2$," Journal of Chemical Engineering of Japan, vol. 49, No. 1, Jan. 20, 2016, pp. 52-59.

Office Action dated Jun. 29, 2022, in Chinese patent application No. 201880030759.0, 9 pages.

* cited by examiner

MODIFIED ACTIVATED CARBON AND METHOD FOR PRODUCING SAME

TECHNICAL FIELD

The present invention relates to a modified activated carbon and a method for producing the same. Particularly, the present invention relates to a modified activated carbon used for an electric double layer capacitor and effective for suppressing gas generation, improving durability, and improving withstand voltage, and a method for producing the same.

BACKGROUND ART

An electric double layer capacitor which is one of energy storage devices uses a capacity (electric double layer capacity) obtained only from physical ion adsorption/desorption without chemical reaction, and therefore has excellent output characteristics and lifetime characteristics as compared to batteries. Due to the characteristics, the electric double layer capacitor has been widely developed for backup of various memories, electric power generation using natural energy, and storage power sources such as UPS (uninterruptible power supply). In recent years, the electric double layer capacitor is attracting attention as auxiliary power sources for electric vehicles (EV) and hybrid vehicles (HV) and for storage of regenerative energy, due to the aforementioned excellent characteristics and from the viewpoint of immediate measures against environmental problems.

Such an in-vehicle electric double layer capacitor is required to have not only higher energy density, but also a higher durability and a further improved electrostatic capacity under severe use conditions (e.g., under severe temperature environment) as compared to consumer use, and various methods have been proposed for improving the durability and the electrostatic capacity of the capacitor. For example, it is known that the durability of the capacitor is significantly affected by a reactivity between a surface functional group of activated carbon to be used and an electrolytic solution, and Patent Document 1 discloses a method for producing activated carbon in which surface functional groups are reduced by a heat treatment of a coconut shell-derived activated carbon at 900 to 1200° C. under an inert gas atmosphere. Patent Document 2 discloses a method for producing an activated carbon in which activated carbon after pulverization is heat-treated at 500 to 1200° C. under an inert gas atmosphere, focusing on the fact that an amount of surface functional groups increases due to pulverization. Furthermore, it is reported in Patent Document 3 that reducing a variation in activated carbon particle diameter can increase an electrostatic capacity and improve an internal resistance.

PRIOR ART DOCUMENT

Patent Document

Patent Document 1: WO 2008/053919 A1
Patent Document 2: Japanese Patent No. 5027849
Patent Document 3: Japanese Patent No. 4796769

SUMMARY OF THE INVENTION

Problem to be Solved by the Invention

However, the durability of the electric double layer capacitor is improved in a limited manner by reducing only an amount of surface functional groups of activated carbon as described in Patent Documents 1 and 2. The method described in Patent Document 3 is not always satisfactory in terms of durability although a certain improvement is observed with respect to initial electrostatic capacity and internal resistance.

Therefore, an object of the present invention is to provide a modified activated carbon useful for improving a durability of an electric double layer capacitor, suppressing gas generation during charge/discharge, and reducing resistance, and a method for producing the same.

Means for Solving Problem

As a result of intensive studies for solving the problems, the present inventors found that it is important to control not only an amount of surface functional groups of activated carbon but also an amount of intra-skeletal oxygen so as to improve the durability of the electric double layer capacitor, thereby completing the present invention.

Therefore, the present invention provides the following preferred aspects.

[1] A coconut shell-derived modified activated carbon having a BET specific surface area of 1400 to 2000 $m^2/g$, a value of hydrogen content/carbon content of 0.0015 to 0.0055, and intra-skeletal oxygen of 0.9 mass % or less.

[2] The modified activated carbon according to [1], wherein an average particle diameter is 3.5 to 16 μm.

[3] The modified activated carbon according to [1] or [2], wherein a content of particles having a particle diameter of 2 μm or less is 9 vol % or less.

[4] The modified activated carbon according to any one of [1] to [3], wherein a zeta potential difference is 30 to 100 mV, and wherein a maximum value of zeta potential is 0 mV or more.

[5] The modified activated carbon according to any one of [1] to [4], wherein an electrical conductivity determined by powder resistance measurement at a load of 12 kN is 9 S/cm or more.

[6] A method for producing the modified activated carbon according to any one of [1] to [5], comprising in random order the steps of:
acid-washing a coconut shell-derived activated carbon;
pulverizing a coconut shell-derived activated carbon to an average particle diameter of 3.5 to 16 μm;
classifying a coconut shell-derived activated carbon to achieve a content rate of 9 vol % or less for particles having a particle diameter of 2 μm or less; and
heat-treating a coconut shell-derived activated carbon at 900 to 1300° C. under an inert gas atmosphere.

[7] The method for producing the modified activated carbon according to [6], comprising a step of deacidification under an oxidizing gas atmosphere at 500 to 1000° C. after acid washing.

[8] A non-aqueous polarizable electrode comprising: the modified activated carbon according to any one of [1] to [5].

[9] An electric double layer capacitor comprising: the non-aqueous polarizable electrode according to [8].

Effect of the Invention

The present invention can provide a modified activated carbon effective for improving the durability of the electric double layer capacitor, suppressing gas generation during charging/discharging, and reducing resistance, and a method for producing the same.

MODES FOR CARRYING OUT THE INVENTION

Figure 1:
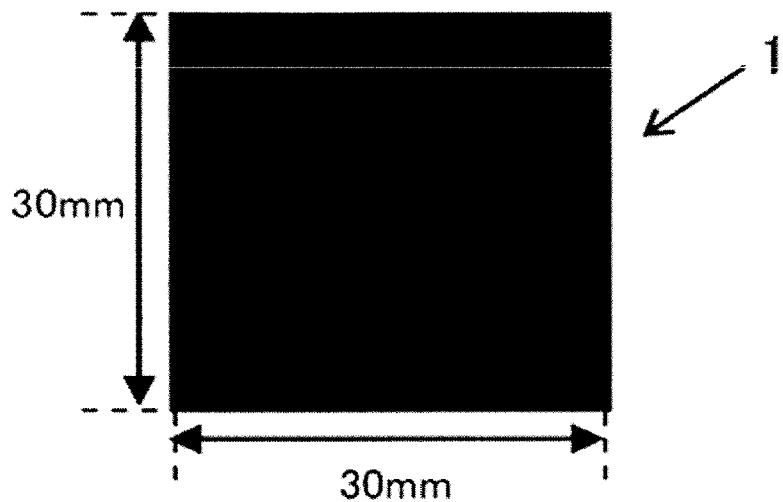
FIG. 1 is a view showing a sheet-shaped electrode composition.

Embodiments of the present invention will now be described in detail. The scope of the present invention is not limited to the embodiments described herein, and various modifications can be made without departing from the spirit of the present invention.

<Modified Activated Carbon>

A modified activated carbon of the present invention is a coconut shell-derived modified activated carbon, having a specific surface area of 1400 $m^2/g$ to 2000 $m^2/g$ according to a BET method, a value of hydrogen content/carbon content of 0.0015 to 0.0055, and intra-skeletal oxygen of 0.9 mass % or less.

The specific surface area according to a BET method (hereinafter also referred to as "BET specific surface area") of the modified activated carbon of the present invention is 1400 $m^2/g$ or more, preferably 1500 $m^2/g$ or more, more preferably 1550 $m^2/g$ or more, further preferably 1600 $m^2/g$ or more. The BET specific surface area less than 1400 $m^2/g$ makes an electrostatic capacity per unit mass smaller and an average pore diameter relatively smaller and therefore tends to increase a resistance possibly caused by diffusion resistance of non-aqueous electrolytic ions in pores during charge/discharge under a large current. On the other hand, the modified activated carbon of the present invention has a BET specific surface area of 2000 $m^2/g$ or less, preferably 1900 $m^2/g$ or less, more preferably 1800 $m^2/g$ or less. The BET specific surface area exceeding 2000 $m^2/g$ reduces a bulk density of an electrode obtained by using this modified activated carbon, tends to reduce an electrostatic capacity per unit volume, and may decrease performance of an electric double layer capacitor obtained by using the modified activated carbon.

In the present invention, the BET specific surface area can be calculated by a nitrogen adsorption method, and can be calculated by, for example, a method described in Examples.

In the modified activated carbon of the present invention, the value of hydrogen content/carbon content (hereinafter sometimes simply referred to as "H/C") is 0.0015 or more, preferably 0.0018 or more, more preferably 0.0022 or more, and is 0.0055 or less, preferably 0.0050 or less, more preferably 0.0045 or less. H/C is an index representative of a degree of development of a carbon crystal structure of activated carbon. H/C less than 0.0015 brings the carbon structure of activated carbon into an excessively developed state and reduces edge portions of the activated carbon, so that it is difficult to obtain a sufficient capacity. On the other hand, H/C exceeding 0.0055 brings the carbon structure into a state having many undeveloped portions and increases the edge portions of activated carbon so that an amount of surface functional groups becomes larger, and therefore, gas generation is promoted. Additionally, a resistance in activated carbon particles can be reduced by controlling H/C within the range. H/C in the modified activated carbon can be controlled within the range by, for example, adjusting a heat treatment temperature in a heat treatment step in a method for producing the modified activated carbon of the present invention described later and controlling the degree of development of the carbon crystal structure of the activated carbon.

The value of H/C in the present invention is a value calculated according to a method described in Examples described later.

In the modified activated carbon of the present invention, the intra-skeletal oxygen is 0.9 mass % or less. The "intra-skeletal oxygen" in the present invention refers to oxygen incorporated in a carbon structure skeleton of activated carbon and specifically means an amount of oxygen measured and calculated by a method described later. The intra-skeletal oxygen exceeding 0.9 mass % increases active sites reactive with an electrolytic solution in an electrode for capacitor, which promotes a decomposition reaction of the electrolytic solution, so that an amount of gas generated during charge/discharge increases, causing a reduction in capacity retention rate. Additionally, the presence of a large amount of the intra-skeletal oxygen may make the development of the crystal structure of carbon difficult, which may lead to further promotion of gas generation and a decrease in capacity retention rate. Therefore, in the present invention, the intra-skeletal oxygen of the modified activated carbon is preferably 0.8 mass % or less, more preferably 0.75 mass % or less, further preferably 0.7 mass % or less, particularly preferably 0.65 mass % or less. The lower limit of the intra-skeletal oxygen of the modified activated carbon of the present invention is not particularly limited, is usually 0.2 mass % or more, and may be 0.3 mass % or more, for example. The intra-skeletal oxygen can be controlled within the range by, for example, adjusting the heat treatment temperature of the heat treatment step in the method for producing the modified activated carbon of the present invention described later and suppressing a content rate of fine particles contained in the modified activated carbon.

Oxygen is also present on a surface of activated carbon as acidic functional groups (surface functional groups), and attempts have been made to improve durability of electric double layer capacitors by reducing the acidic functional groups present on the surface of activated carbon (e.g., Patent Documents 1 and 2). However, even if only the amount of oxygen present on the surface is reduced, oxygen present in the carbon structure skeleton allows the intra-skeletal oxygen to react with an electrolytic solution, causing an increase in amount of the gas generation and a reduction in the capacity retention rate, and therefore, it is difficult to improve the durability of the electric double layer capacitor. In contrast, in the present invention, the decomposition reaction of the electrolytic solution can be effectively suppressed by reducing not only the oxygen (acidic functional groups) present on the activated carbon surface but also the intra-skeletal oxygen, resulting in the modified activated carbon having a high gas-generation suppression effect during charge/discharge and a high capacity retention rate when used as an electrode material.

The intra-skeletal oxygen of the modified activated carbon of the present invention is calculated, on the assumption that the acidic functional groups present on the modified activated carbon surface are composed of only one oxygen functional group (hydroxyl group, quinone group, etc.), as a value (%) obtained by subtracting a surface oxygen amount (%) calculated from an amount of the acidic functional groups present on the activated carbon surface from a total oxygen amount (%) present in the modified activated carbon according to the following equation.

$$\text{Intra-skeletal oxygen (\%)} = \text{total oxygen (\%)} - \text{surface oxygen (\%)}$$

Methods for measuring and calculating the total oxygen amount and the surface oxygen amount in the modified activated carbon are described in detail in Examples described later.

An average particle diameter of the modified activated carbon of the present invention is preferably 3.5 to 16 μm, more preferably 4 to 15 μm, and further preferably 5 to 10 μm. When the average particle diameter is within the range, a paste can be prevented from thickening during fabrication of an electrode due to an increase in fine powder, so that the electrode can easily be produced. Moreover, the bulk density of the electrode can moderately be increased, and a high electrostatic capacity can be ensured, which is preferable from the viewpoint of internal resistance.

In the present invention, the average particle diameter can be measured by a laser diffraction measurement method and, for example, can be calculated by the method described in Examples.

Furthermore, in the modified activated carbon of the present invention, a content rate of particles having a particle diameter of 2 μm or less is preferably 9 vol % or less, more preferably 8 vol % or less, further preferably 7 vol % or less. The fine particles having a particle diameter of 2 μm or less are rich in the surface functional groups and the intra-skeletal oxygen and therefore have high reactivity with the electrolytic solution. Thus, when the content rate of the particles having a particle diameter of 2 μm or less is made equal to or less than the upper limit, the gas-generation suppression effect can be enhanced during charge/discharge, and a reduction in the capacity retention rate can be suppressed. Additionally, a contact resistance between activated carbon particles can be reduced by controlling the content rate of particles having a particle diameter of 2 μm or less within the range. The lower limit of the content rate of particles having a particle diameter of 2 μm or less is not particularly limited and is preferably 1 vol % or more, more preferably 2 vol %, further preferably 3 vol % or more since an excessively small content rate may cause a decrease in electrostatic capacity due to a reduction in electrode density.

In a preferred embodiment of the present invention, the modified activated carbon has an average particle diameter of 3.5 to 16 μm and a content rate of 9 vol % or less for particles having a particle diameter of 2 μm or less. When the average particle diameter is within the range, a high electrostatic capacity can be ensured;

however, if the average particle diameter within the range is satisfied while a large amount of fine particles is contained, gas generation is easily promoted when the modified activated carbon is used as an electrode material, due to the intra-skeletal oxygen present in a large amount in the fine particles and the oxygen derived from the surface functional groups. Therefore, by reducing the content rate of such fine particles, the amount of oxygen contained in the activated carbon can be kept at a lower level as a whole, and when the modified activated carbon is used for an electric double layer capacitor, the durability thereof can effectively be enhanced.

In the modified activated carbon of the present invention, a particle diameter ($D_{100}$) at a volume proportion of 100% in volume cumulative particle size distribution is preferably 30 μm or less, more preferably 25 μm or less. By controlling an amount of particles having a large-sized particle diameter (hereinafter also referred to as "large particles") significantly deviating from the average particle diameter in addition to the fine particles contained in the modified activated carbon, the electrode can easily be formed into a thin layer, and the double layer capacitor can easily be reduced in resistance. Additionally, removing the large particles can reduce possibilities of damage of a current collector or formation of sink marks due to pressing when the electrode is formed into a thin layer.

In the modified activated carbon of the present invention, preferably, a zeta potential difference is 30 to 100 mV, and a maximum zeta potential value is 0 mV or more. In the present invention, the "zeta potential difference" means a difference between a maximum value and a minimum value of the zeta potential. The zeta potential is an index of particle stability of the activated carbon, and when the zeta potential difference is smaller, the modified activated carbon is more difficult to polarize and is considered as having a narrower potential window. When the zeta potential difference is larger, the potential window becomes wider; however, the polarization tends to be biased. If fine particles are contained in a large amount, the zeta potential difference increases due to the ease of electrophoresis, while an increase in resistance due to current leakage and an increase in amount of a binder at the time of electrode molding lead to reductions in the electrostatic capacity and the capacity retention rate. The zeta potential difference is more preferably in the range of 30 to 50 mV, further preferably in the range of 30 to 45 mV. Furthermore, when the maximum zeta potential is less than 0 mV, the modified activated carbon is difficult to polarize and is considered as having a narrow potential window. In the present invention, the maximum value of the zeta potential is more preferably in the range of 0 to 15 mV, further preferably in the range of 0 to 10 mV. When the zeta potential difference and the maximum value of the zeta potential are within the ranges, since the potential window is large and the polarization is hardly biased, a load on the activated carbon is hardly generated during charge/discharge so that deterioration of the activated carbon can be suppressed, and therefore, by using such modified activated carbon, the electric double layer capacitor can be increased in the capacity retention rate and improved in the durability.

The zeta potential of the activated carbon can be controlled by, for example, adjusting the heat treatment temperature in the heat treatment step in the method for producing the modified activated carbon of the present invention described later and suppressing the content rate of the fine particles contained in the modified activated carbon.

In the modified activated carbon of the present invention, an electrical conductivity determined by powder resistance measurement at a load of 12 kN is preferably 9 S/cm or more, more preferably 11 S/cm or more. The electrical conductivity is preferably 20 S/cm or less, more preferably 18 S/cm or less. When the electrical conductivity falls within the range, both high electrostatic capacity and durability can be achieved.

<Method for Producing Modified Activated Carbon>

The modified activated carbon of the present invention can be produced by a production method comprising, for example, a step of acid-washing a coconut shell-derived activated carbon (hereinafter also referred to as "acid washing step"), a step of pulverizing a coconut shell-derived activated carbon to an average particle diameter of 3.5 to 16 μm (hereinafter also referred to as "pulverization step"), a step of classifying a coconut shell-derived activated carbon to achieve a content rate of 9 vol % or less for particles having a particle diameter of 2 μm or less (hereinafter, also referred to as "classification step"), and a step of heat-treating a coconut shell-derived activated carbon at 900 to 1300° C. under an inert gas atmosphere (hereinafter also referred to as "heat treatment step"). In the production method, the order of the steps is not specifically limited and may be random order.

The production method may comprise (i) a step of deacidification under an oxidizing gas atmosphere at 500 to 1000° C. after acid washing (hereinafter also referred to as "deacidification step"), and/or may comprise (ii) an activation step of performing an activation treatment of an activated carbon precursor to obtain a coconut shell-derived activated carbon as a raw material (hereinafter also referred to as "activation step").

In the present invention, the modified activated carbon is preferably an activated carbon obtained through the four steps of the acid washing step, the pulverization step, the classification step, and the heat treatment step which the method for producing the modified activated carbon of the present invention comprises.

The modified activated carbon of the present invention is derived from a coconut shell and can be obtained by using an activated carbon precursor derived from a coconut shell as a main raw material. The modified activated carbon of the present invention is derived from a coconut shell and therefore hardly structurally shrunk even at the heat treatment step under an inert gas and can maintain a high specific surface area. As compared to activated carbon derived from minerals or synthetic materials, the coconut shell-derived activated carbon is advantageous from the viewpoint of reducing harmful impurities and from the viewpoint of environmental protection. Additionally, since a coconut shell is available in a large amount, the coconut shell-derived activated carbon is also advantageous from the commercial point of view.

The palm used as raw materials for the coconut shell is not particularly limited, and may be, for example, palm trees (oil palm), coconut trees, Salak, or double coconuts. The coconut shells obtained from these palms can be used alone or in combination of two or more of them. Among them, coconut shells derived from coconut trees or palm trees are biomass waste generated in a large amount after being used for food, detergent raw material, biodiesel oil raw material, etc., and are particularly preferable because of being easily available and inexpensive.

Coconut shell is available in the form of char (e.g., coconut shell char) after pre-calcining, and it is preferred to use the char as a crude raw material. Char generally refers to powdery solid rich in carbon generated without melting/softening when coal is heated; however, in this description, the char also refers to powdery solid material which is rich in carbon generated without melting/softening by heating an organic substance. A method for producing a char from coconut shell is not particularly limited, and the char can be produced by using a method known in the art. For example, coconut shell that serves as a raw material is subjected to calcining (carbonization treatment) at a temperature of about 400 to 800° C. under an atmosphere of an inert gas such as nitrogen, carbon dioxide, helium, argon, carbon monoxide, or combustion exhaust gas, a mixed gas of these inert gases, or a mixed gas containing these inert gases as main components with another gas.

[Activation Step]

The coconut shell-derived activated carbon used in the present invention can be obtained by, for example, carrying out an activation treatment of the activated carbon precursor (coconut shell char). The activation treatment is a treatment of forming pores on the surface of the activated carbon precursor to change the precursor to a porous carbonaceous material, and as a result, the activated carbon (raw material activated carbon) having large specific surface area and pore volume can be obtained. If activated carbon precursor is used as it is without the activation treatment, the obtained carbonaceous material has insufficient specific surface area and pore volume, which makes it difficult to ensure a sufficiently high initial capacity when used as an electrode material, so that the modified activated carbon of the present invention cannot be obtained. The activation treatment can be carried out by a method common in the art, and there are mainly two types of treatment methods, i.e., a gas activation treatment and a chemical activation treatment.

As one example of the gas activation treatment, a method is known, in which an activated carbon precursor is heated in the presence of water vapor, carbon dioxide, air, oxygen, combustion gas, or a mixed gas thereof. As one example of the chemical activation treatment, a method is known, in which an activated carbon precursor is mixed with an activator such as zinc chloride, calcium chloride, phosphoric acid, sulfuric acid, sodium hydroxide, potassium hydroxide, magnesium hydroxide, and calcium hydroxide and is heated under an inert gas atmosphere. In the present invention, the gas activation treatment is preferably used since the chemical activation requires a step of removing a remaining chemical and the production method becomes complicated.

When water-vapor activation is employed as the gas activation treatment, it is preferable to use a mixture of the same inert gas used during the carbonization treatment and water vapor from the viewpoint of efficient activation, and a partial pressure of water vapor in this case is preferably in a range of 10 to 60%. The water-vapor partial pressure of 10% or more facilitates sufficient activation, and the partial pressure of 60% or less suppresses a rapid activation reaction so that the reaction is easily controlled.

A total amount of activation gas supplied in the water-vapor activation is preferably 50 to 10,000 parts by mass, more preferably 100 to 5000 parts by mass, and further preferably 200 to 3000 parts by mass relative to 100 parts by mass of the activated carbon precursor. When the total amount of the supplied activation gas is within the range, the activation reaction can proceed more efficiently.

In the present invention, the BET specific surface area of the coconut shell-derived activated carbon used as a raw material is preferably 1400 $m^2/g$ or more and 2000 $m^2/g$ or less, more preferably 1600 $m^2/g$ or more and 1900 $m^2/g$ or less. The pore volume of the coconut shell-derived activated carbon used as a raw material is preferably 0.6 mL/g or more and 1.2 mL/g or less, more preferably 0.7 mL/g or more and 1.0 mL/g or less. When the BET specific surface area and the pore volume of the coconut shell-derived activated carbon used as a raw material are within the ranges, a modified activated carbon having a sufficient capacity for electric double layer capacitors can be obtained.

The specific surface area and the pore volume of the coconut shell-derived activated carbon used as a raw material can be controlled by changing the activation treatment method of the activated carbon precursor and conditions thereof. For example, when the raw material activated carbon is obtained by the water-vapor activation treatment, the control can be achieved through gas used, heating temperature, time and the like. In the water-vapor activation treatment, the specific surface area and the average pore diameter of the raw material activated carbon to be obtained tend to decrease when the heating temperature is low and tend to increase when the heating temperature is high. In the present invention, when the raw material activated carbon is obtained by water-vapor activation treatment, the heating temperature (activation temperature) depends on a type of the gas used and is usually 700 to 1100° C., preferably 800 to 1000° C. A heating time and a temperature rising rate are not particularly limited and may appropriately be determined depending on a heating temperature, a desired specific surface area of the activated carbon and the like.

[Acid Washing Step]

The method for producing the modified activated carbon of the present invention comprises an acid washing step. In the present invention, the acid washing step is a step for removing impurities such as metal components contained in the activated carbon by washing the coconut shell-derived activated carbon with a washing liquid containing an acid. The acid washing can be carried out by, for example, immersing the raw material activated carbon in a washing liquid containing an acid. In the acid washing step, the raw activated carbon may be washed with an acid (e.g., hydrochloric acid) and then washed with water, and the water washing and the acid washing may be carried out in an appropriate combination such as repeating the acid washing and the water washing.

Preferable examples of the acid washing liquid comprise inorganic acids such as hydrochloric acid, sulfuric acid, and nitric acid, and organic acids such as saturated carboxylic acids, such as formic acid, acetic acid, propionic acid, oxalic acid, tartaric acid, and citric acid, and aromatic carboxylic acids, such as benzoic acid and terephthalic acid. Among them, washing with hydrochloric acid not oxidizing activated carbon is more preferable. When hydrochloric acid is used as the acid washing liquid, the concentration of hydrochloric acid is preferably 0.1 to 3.0%, more preferably 0.3 to 1.0%. Since the number of times of acid washing must be increased for removing impurities if the concentration of hydrochloric acid is too low, and conversely, an amount of residual hydrochloric acid increases if the concentration is too high, the concentration within the range can make the acid washing step efficient and is preferable in terms of productivity.

The liquid temperature at the time of acid washing and water washing is not particularly limited and is preferably 0 to 98° C., more preferably 10 to 95° C., and further preferably 15 to 90° C. The temperature of the washing liquid at the time of immersion of the raw material activated carbon is desirably within the range since the washing is performed in a practical time with a load on an apparatus suppressed.

[Deacidification Step]

The method for producing the modified activated carbon of the present invention may comprise a deacidification step for removing an acid (e.g., hydrochloric acid) derived from the acid washing liquid remaining on the activated carbon after the acid washing. In the present invention, in the deacidification step, it is preferable that the raw material activated carbon after the acid washing is heated under an oxidizing gas atmosphere for a short time to bring the raw material activated carbon into contact with the oxidizing gas for a short time, and the residual acid is removed along with a further activation reaction.

Examples of the oxidizing gas include oxygen, water vapor, a carbon dioxide gas, and a combustion gas obtained by combusting kerosene or propane. These oxidizing gases may be mixed before use or may be diluted with an inert gas before use. Among them, a combustion gas obtained by combusting kerosene or propane, or a gas obtained by adding water vapor to the combustion gas, is more preferable since the gas can also be used as a heat source. The concentration of the oxidizing gas may appropriately be determined depending on a type of the gas to be used and is usually 1 to 40% when water vapor is added, and preferably 2% or more when a carbon dioxide gas is added.

The treatment temperature for bringing the oxidizing gas into contact with the raw material activated carbon is preferably 500 to 1000° C., more preferably 650 to 850° C. A temperature within the range is preferable since the activation reaction can appropriately be advanced without significantly changing the pore structure of the raw material activated carbon. The time of contact with the oxidizing gas varies depending on the contact temperature and is usually about 30 minutes to 3 hours.

[Pulverization Step]

The method for producing the modified activated carbon of the present invention comprises a pulverization step. In the present invention, the pulverization step is a step for controlling the shape and the particle diameter of the finally obtained modified activated carbon into desired shape and particle diameter. The modified activated carbon of the present invention is particularly suitable due to properties thereof for a material for non-aqueous polarizable electrodes used in electric double layer capacitors. For a particle diameter suitable for such use, the coconut shell-derived activated carbon is pulverized in the pulverization step of the present invention to an average particle diameter of preferably 3.5 to 16 μm, more preferably 4 to 15 μm, and further preferably 5 to 10 μm.

A pulverizer used for pulverization is not particularly limited and, for example, known pulverizers such as a cone crusher, a double roll crusher, a disc crusher, a rotary crusher, a ball mill, a centrifugal roll mill, a ring roll mill, a centrifugal ball mill, and a jet mill can be used alone or in combination.

[Classification Step]

The method for producing the modified activated carbon of the present invention comprises a classification step. The classification step is a step for controlling a particle size of activated carbon so that the finally obtained modified activated carbon of the present invention does not contain fine particles (particles having a particle diameter of 2 μm or less) exceeding a predetermined amount. The step is usually carried out at the same time as, or on the downstream of, the pulverization step.

Depending on a pulverization condition, the activated carbon obtained through the pulverization step may contain particles having a particle diameter significantly deviating from the average particle diameter. In the present invention, by reducing the content rate of fine particles having a small particle diameter significantly deviating from the average particle diameter, the intra-skeletal oxygen and the surface functional groups contained in the obtained modified activated carbon can effectively be reduced. Therefore, the obtained modified activated carbon is excellent in gas-generation suppression effect and durability when used in an electric double layer capacitor. In the classification step in the production method of the present invention, classification is carried out such that the content of particles having a particle diameter of 2 μm or less is preferably 9 vol % or less, more preferably 8 vol % or less, and further preferably 7 vol % or less.

Furthermore, from the viewpoint of forming an electrode into a thin layer and reducing the resistance of the electric double layer capacitor, a content of large particles having a large particle diameter significantly deviating from the average particle diameter is preferably reduced in the classification step of the present invention. For example, the particle diameter of the activated carbon is preferably controlled such that a particle diameter ($D_{100}$) at a volume proportion of 100% in volume cumulative particle size distribution of the activated carbon is preferably 30 μm or less, more preferably 25 μm or less.

In the present invention, the term "classification" broadly means an operation for controlling a particle size of activated carbon. In the classification step of the present invention, examples of a method for classifying activated carbon (controlling a particle diameter of activated carbon) include a method for removing fine particles having a particle diameter of 2 μm or less contained in the activated carbon after pulverization, and a method for controlling a content of particles of 2 μm or less by performing pulverization such that an average particle diameter of obtained activated carbon becomes slightly larger than a desired average particle diameter and removing large particles contained in the activated carbon as needed so that the desired average particle diameter is achieved. In the latter method, by pulverizing only the removed large particles again to achieve a desired average particle diameter and repeating this operation, the modified activated carbon of the present invention which does not contain fine particles exceeding a predetermined amount can be produced with higher productivity. In the present invention, the pulverization step and the classification step may be performed at the same time.

A method for removing fine particles and/or large particles is not particularly limited, and examples thereof include classification using a sieve, wet classification, and dry classification. Examples of wet classifiers include classifiers utilizing principles of gravity classification, inertia classification, hydraulic classification, or centrifugal classification. Examples of dry classifiers include classifiers utilizing principles of sedimentation classification, mechanical classification, or centrifugal classification. From the economical viewpoint, a dry classifier is preferably used. The pulverization step and the classification step can also be carried out by using one apparatus. For example, pulverization and classification can be carried out by using a jet mill having a dry classification function.

[Heat Treatment Step]

The method for producing the modified activated carbon of the present invention comprises a heat treatment step. By heat-treating the coconut shell-derived activated carbon, the carbon structure can be developed, and the intra-skeletal oxygen and the surface functional groups can be reduced. The heat treatment temperature is preferably 900 to 1300° C., more preferably 900 to 1200° C., further preferably 900 to 1100° C., and particularly preferably 1000 to 1100° C. If the heat treatment temperature is too low, the carbon structure is not sufficiently developed, and the intra-skeletal oxygen cannot sufficiently be removed. If the temperature is too high, although the intra-skeletal oxygen decreases, a sufficient capacity cannot be obtained due to a reduction in specific surface area caused by pore shrinkage of the activated carbon and a reduction of activated carbon edge surfaces. A heat treatment time may appropriately be determined depending on a heat treatment temperature, a heating method, equipment used, etc., and is usually 0.1 to 10 hours, preferably 0.3 to 8 hours, and more preferably 0.5 to 5 hours. By selecting and adjusting the heat treatment temperature and time within the range, the obtained modified activated carbon can be controlled in terms of the intra-skeletal oxygen, the value of hydrogen content/carbon content, the BET specific surface area and the like. The shape of the activated carbon during the heat treatment may be granular or powdery.

The heat treatment is preferably carried out under an inert gas condition or under a gas atmosphere generated from activated carbon while oxygen or air is blocked. Examples of the inert gas used for the heat treatment include nitrogen gas, argon gas, helium gas, etc. These gases may be used alone or as a mixed gas obtained by mixing two or more of them.

Various types of furnaces such as a rotary kiln, a fluidized bed furnace, a fixed bed furnace, and moving bed furnaces can be used as a furnace used for the heat treatment. Both a continuous furnace and a batch furnace for which input of raw materials and removal of products are performed continuously and intermittently, respectively can be employed. Any means capable of heating to a predetermined temperature can be used as a heating means without problem, and electric heating, gas combustion heating, high frequency induction heating, energization heating, etc. are applicable. These heating means may be used alone or in combination.

By adjusting the heat treatment temperature and time, the heat treatment step may also serve as the deacidification step described above. By performing the deacidification step and the heat treatment step at the same time, the modified activated carbon of the present invention can be produced with higher productivity.

The method for producing the modified activated carbon of the present invention can be carried out as a production method comprising some or all of the acid washing step, the pulverization step, the classification step, and the heat treatment step. These steps can be carried out in random order and can be rearranged as appropriate depending on equipment used for the production. For example, preferred embodiments of the present invention may comprise the following orders of steps.

(1) acid washing→deacidification→pulverization→classification→heat treatment (2) acid washing→deacidification→pulverization→heat treatment→classification (3) acid washing→deacidification→heat treatment→pulverization→classification (4) acid washing→pulverization→classification→heat treatment (5) acid washing→pulverization→heat treatment→classification (6) acid washing→heat treatment→pulverization→classification (7) pulverization→classification→acid washing→(optionally deacidification)→heat treatment (8) pulverization→acid washing→(optionally deacidification)→classification→heat treatment The modified activated carbon of the present invention can suitably be used as an electrode material for various battery devices. Particularly, the modified activated carbon is suitable for a non-aqueous polarizable electrode material for an electric double layer capacitor. By using the modified activated carbon of the present invention, an amount of gas generated can be reduced during charge/discharge and a high capacity can be maintained over a long period in the electric double layer capacitor. Therefore, an embodiment of the present invention can provide a non-aqueous polarizable electrode comprising the modified activated carbon of the present invention and can also provide an electric double layer capacitor comprising the non-aqueous polarizable electrode.

The non-aqueous polarizable electrode of the present invention is characterized in that the modified activated carbon of the present invention is used. The non-aqueous polarizable electrode of the present invention can be produced by, for example, a method comprising: using an electrode material obtained by kneading the modified activated carbon of the present invention serving as a raw material with components such as a conductivity imparting agent, a binder, and a solvent and by coating and drying the kneaded product so as to prepare a paste by adding a solvent to the electrode material; applying the paste to a collector plate such as an aluminum foil; then removing the solvent by drying; and putting the paste into a mold for press forming.

Examples of the conductivity imparting agent used for the electrode include acetylene black, Ketjen black. Examples of the binder include polytetrafluoroethylene, a fluorinated polymer compound such as polyvinylidene fluoride, carboxymethyl cellulose, styrene-butadiene rubber, petroleum pitch, a phenol resin. Examples of the solvent include water, alcohols such as methanol and ethanol, saturated hydrocarbons such as hexane and heptane, aromatic hydrocarbons such as toluene, xylene, and mesitylene, ketones such as acetone and ethyl methyl ketone, and esters such as methyl acetate and ethyl acetate, amides such as N,N-dimethylformamide and N,N-diethylformamide, cyclic amides such as N-methylpyrrolidone and N-ethylpyrrolidone.

The electric double layer capacitor of the present invention is characterized in that the non-aqueous polarizable electrode is used. The electric double layer capacitor generally has a structure mainly made up of electrodes, an electrolytic solution, and a separator such that the separator is disposed between paired electrodes. Examples of the electrolytic solution include an electrolytic solution in which an amidine salt is dissolved in an organic solvent such as propylene carbonate, ethylene carbonate, and methylethyl carbonate, an electrolytic solution in which a quaternary ammonium salt of perchloric acid is dissolved, an electrolytic solution in which tetrafluoroborate or hexafluorophosphate of quaternary ammonium or alkali metal such as lithium is dissolved, and an electrolytic solution in which a quaternary phosphonium salt is dissolved. Examples of the separator include cellulose, glass fiber, or nonwoven fabric, cloth, and microporous film mainly composed of polyolefin such as polyethylene and polypropylene. The electric double layer capacitor can be produced by, for example, arranging these main constituent elements according to a common method conventionally used in the art.

Since an amount of the intra-skeletal oxygen is effectively reduced in addition to an amount of the surface functional groups present on the surface of the activated carbon, the electric double layer capacitor comprising the modified activated carbon of the present invention has a low reactivity with an electrolytic solution, a high gas-generation suppression effect during charge/discharge, a capacity reduction due to long-term use suppressed at a low level, and excellent durability, and can maintain excellent capacitor performance even at low temperatures.

EXAMPLES

The present invention will hereinafter be described in more detail with examples; however, the present invention is not limited to the following examples. Physical property values in Examples and Comparative Examples were measured by the following methods.

The BET specific surface area, average pore diameter, H/C, zeta potential, particle size distribution, and intra-skeletal oxygen amount of coconut shell activated carbon used as a raw material and/or modified activated carbon were measured/calculated according to the following methods.

<Method for Measuring Specific Surface Area and Average Pore Diameter>

A nitrogen adsorption/desorption isotherm of activated carbon at 77K was measured with BELSORP-mini manufactured by MicrotracBEL corporation after heating activated carbon used as a sample at 300° C. under a nitrogen gas stream (nitrogen flow rate: 50 mL/min) for 3 hours. The obtained adsorption/desorption isotherm was analyzed by a multipoint method with the BET equation, and the specific surface area was calculated from a straight line in a region of a relative pressure $P/P_0=0.01$ to 0.1 of an obtained curve. The pore volume was calculated from a nitrogen adsorption amount at the relative pressure $P/P_0=0.99$, and the average pore diameter was calculated by using the specific surface area and the pore volume from the following equation.

$$\text{average pore diameter [nm]}=4000\times\text{pore volume [cm}^3\text{/g]/specific surface area (m}^2\text{/g)}$$

<Method for Measuring H/C>

A hydrogen content [mass %] and a carbon content [mass %] of the activated carbon used as a sample were measured with Vario EL III manufactured by ELEMENTAR by using sulfanilic acid as a reference substance. In consideration of variations of measured values, Activated Carbon YP-17D manufactured by Kuraray Chemical Co., Ltd. was measured as a standard sample at the same time, and measured values were multiplied and thereby corrected by a coefficient such that the hydrogen content of YP-17D was adjusted to 0.64 mass %, and H/C was calculated from the following equation.

$$H/C=\text{hydrogen content [mass %]/carbon content [mass %]}$$

<Method for Measuring Zeta Potential Difference>

A dispersion was prepared by adding 5 mg of activated carbon powder used as a sample to 50 mL of sodium chloride aqueous solution having a concentration of 10 mmol/L adjusted to pH 3 to 11 with 0.1 N HCl and NaOH. This dispersion and a solvent were mixed at a volume ratio of 1:1, diluted, subjected to an ultrasonic treatment for 5 minutes by using an ultrasonic cleaner (USM-1 manufactured by SND Co., Ltd.), and then allowed to stand for 5 minutes. After standing, a supernatant was collected and measured by using a zeta potential measuring device (ELS-600 manufactured by Otsuka Electronics Co., Ltd.). Among zeta potentials measured under respective solvent conditions, an absolute value of a difference between the maximum value and the minimum value was determined as the zeta potential difference.

<Method for Measuring Electrical Conductivity>

An electrical conductivity of activated carbon was measured by using a powder resistivity measuring unit "MCP-PD51" manufactured by Mitsubishi Chemical Analytech. The electrical conductivity was measured by using a sample in such an amount that an activated carbon pellet had a thickness of 3.5 to 4.5 mm when a load of 12 kN was applied, and the electrical conductivity of the activated carbon pellet was measured under the load of 12 kN.

<Method for Measuring Particle Diameter>

A particle diameter of powdered activated carbon was measured by a laser diffraction measurement method. Specifically, activated carbon powder to be measured was put into ion-exchanged water together with a surfactant, subjected to ultrasonic vibration by using a BRANSONIC M2800-J manufactured by EMERSON to produce a uniform dispersion, and measured by an absorption method by using Microtrac MT3200 manufactured by MicrotracBEL Corporation. The activated carbon concentration of the uniform dispersion was adjusted to be within the measured concentration range displayed by the apparatus. "Polyoxyethylene (10) octylphenyl ether (Triton X-100)" manufactured by Wako Pure Chemical Industries was used as the surfactant used for the purpose of uniform dispersion. The surfactant was added in an appropriate amount enabling uniform dispersion without generating bubbles affecting the measurement. Analysis conditions are listed below.

(Analysis Conditions)

Number of measurements: 1
Measurement time: 30 seconds
Distribution display: volume
Particle diameter classification: standard
Calculation mode: MT3000
Solvent: WATER
Upper limit of measurement: 1408 μm, lower limit of measurement: 0.243 μm
Residual material ratio: 0.00
Passing material ratio: 0.00
Residual material ratio setting: invalid
Particle permeability: absorption
Particle refractive index: N/A
Particle shape: N/A
Solvent refractive index: 1.333
DV value: 0.0150 to 0.0500
Transmittance (TR); 0.750 to 0.920
Flow rate: 50%

Hereinafter, in the examples, the average particle diameter of the powdered activated carbon indicates a value of particle diameter at a volume proportion of 50% in the volume cumulative particle size distribution.

<Method for Measuring/Calculating Intra-Skeletal Oxygen>

1. Measurement of Total Oxygen Content

A total oxygen content of activated carbon used as a sample was measured with Vario EL III manufactured by ELEMENTAR by using benzoic acid as a reference substance. In consideration of variations of measured values, Activated Carbon YP-17D manufactured by Kuraray Chemical Co., Ltd. was measured as a standard sample at the same time, and measured values were multiplied and thereby corrected by a coefficient such that the total oxygen content of YP-17D was adjusted to 2.13% before determining the total oxygen content [%] in the activated carbon.

2. Measurement of Surface Functional Groups (Acidic Functional Groups)

An amount of surface functional groups was measured by a known hydrochloric acid titration method according to H. P. Boem, Advan. Catal., 1966, 16, 179, etc. Specifically, a 0.1 N ethanol solution was prepared as a measurement solution by using sodium ethoxide manufactured by Kojundo Chemical Laboratory Co., Ltd. To 25 ml of this measurement solution, 0.5 g of activated carbon was added as a sample and stirred at 25° C. for 24 hours. After stirring, the measurement solution and the activated carbon were separated by centrifugation, and 10 ml of the measurement solution was collected to perform neutralization titration with a titration end point set to a point of pH 4.0 in the case of 0.1N hydrochloric acid by using "888 Titrando" manufactured by Swiss Metrohm for determining a sample titer. On the other hand, a blank test was performed with a solution containing no sample to determine a blank test titer, and a surface functional group amount was calculated from the following equation. In consideration of variations of measured values, Activated Carbon YP-50F manufactured by Kuraray Chemical Co., Ltd was measured as a standard sample at the same time, and measured values were multiplied and thereby corrected by a coefficient such that the surface functional group amount of YP-50F was adjusted to 0.367 meq/g before determining the surface functional group amount.

$$\text{Surface functional group amount [meq/g]} = (\text{blank test titer [mL]} - \text{sample titer [mL]}) \times 0.1 \times f \text{ (hydrochloric acid factor)/weight [g] of active carbon used} \times 25[\text{mL}]/10[\text{mL}]$$

3. Method for Calculating Intra-Skeletal Oxygen

Oxygen present in the carbon skeleton (intra-skeletal oxygen) of each activated carbon was calculated according to a calculation method described below.

First, assuming that the surface functional groups (acidic functional groups) present on the activated carbon surface are basically composed of only one oxygen functional group such as a hydroxyl group or a quinone group, surface oxygen [%] was calculated by using the surface functional group amount [meq/g] per 1 g of activated carbon.

$$\text{Surface oxygen [\%]} = \text{surface functional group amount [meq/g]} \times 16 \text{ (g/eq)}/10$$

A difference of the total oxygen content [%] in the activated carbon determined by the elemental analysis measurement and the surface oxygen [%] converted from the surface functional group amount was then calculated, and this value was defined as the intra-skeletal oxygen.

$$\text{Intra-skeletal oxygen [\%]} = \text{total oxygen [\%]} - \text{surface oxygen [\%]}$$

Example 1

(1) Preparation of Raw Material Activated Carbon

A coconut shell activated carbon (specific surface area 1087 m$^2$/g) which was water vapor-activated at 900° C. in an activated gas adjusted to a water vapor partial pressure of 35% by supplying steam to a kerosene combustion gas (mixed gas of $H_2O$, $CO_2$, CO, $N_2$) was acid-washed by using hydrochloric acid (concentration: 0.5N, diluting solution: ion-exchanged water) at a temperature of 70° C. for 30 minutes and was then sufficiently washed with ion-exchanged water to remove the residual acid and dried to obtain a primary-washed granular activated carbon. This primary-washed granular activated carbon was further subjected to secondary activation at 950° C. in an activation gas adjusted to a water vapor partial pressure of 15% by supplying steam to a propane combustion gas to obtain a secondary-activated granular activated carbon having a specific surface area 1633 m$^2$/g and an average pore diameter 2.07 nm.

(2) Preparation of Modified Activated Carbon

The obtained secondary-activated granular activated carbon was acid-washed in the same way as the primary washing and dried and was then deacidified by a heat treatment at 820° C. to obtain a deacidified granular activated carbon. This deacidified granular activated carbon was finely pulverized and then classified by using a classifier "Classiel N-20" manufactured by Seishin Enterprise so as to have an average particle diameter of 5.68 μm with a content of 5.32 vol % for particles having a particle diameter of 2 μm or less to obtain a coarse powder. The classification was carried out under conditions allowing removal of fine particles having a particle diameter of 2 μm or less. Subsequently, the obtained coarse powder was heat-treated by raising temperature stepwise under a nitrogen atmosphere (gas flow rate: 1 L/min) at a temperature increase rate of 24° C./min to 600° C., at a temperature increase rate of 12° C./min to 900° C., and at a temperature increase rate of 1.67° C./min to 1100° C. and then keeping at 1100° C. for 60 minutes. This is followed by natural cooling under the atmosphere of the gas (nitrogen) used until the furnace temperature became 70° C. or less to obtain an activated carbon powder for a non-aqueous polarizable electrode. The physical properties of the obtained activated carbon are shown in Table 1. Regarding the particle diameter, it is considered that no substantial change occurs in particle diameter due to the heat treatment, and the particle diameter before the heat treatment is described.

Example 2

An activated carbon for a non-aqueous polarizable electrode was obtained in the same manner as that of Example 1 except that the fine pulverization and classification were carried out so as to have an average particle diameter of 5.83 μm with a content of 4.33 vol % for particles having a particle diameter of 2 μm or less and that the temperature was raised stepwise under a nitrogen atmosphere at a temperature increase rate of 24° C./min to 600° C., at a temperature increase rate of 12° C./min to 900° C., and at a temperature increase rate of 1.67° C./min to 1000° C. and then kept at 1000° C. for 60 minutes to perform the heat treatment. The treatment conditions and the physical properties of the obtained activated carbon are shown in Table 1.

Example 3

An activated carbon for a non-aqueous polarizable electrode was obtained in the same manner as that of Example 1 except that the fine pulverization and classification were carried out so as to have an average particle diameter of 5.89 μm with a content of 4.06 vol % for particles having a particle diameter of 2 μm or less and that the temperature was raised stepwise under a nitrogen atmosphere at a temperature increase rate of 24° C./min to 600° C. and at a temperature increase rate of 12° C./min to 900° C. and then kept at 900° C. for 60 minutes to perform the heat treatment. The treatment conditions and the physical properties of the obtained activated carbon are shown in Table 1.

Example 4

The deacidified granular activated carbon obtained in the same manner as that of Example 1 was heat-treated by raising temperature stepwise under a nitrogen atmosphere (gas flow rate: 1 L/min) at a temperature increase rate of 24° C./min to 600° C., at a temperature increase rate of 12° C./min to 900° C., and at a temperature increase rate of 1.67° C./min to 1000° C. and then keeping at 1000° C. for 60 minutes. This is followed by natural cooling under the atmosphere of the gas (nitrogen) used until the furnace temperature became 70° C. or less to obtain a heat-treated granular activated carbon. The heat-treated granular activated carbon was finely pulverized and classified so as to have an average particle diameter of 5.65 μm with a content of 4.85 vol % for particles having a particle diameter of 2 μm or less to obtain an activated carbon powder for a non-aqueous polarizable electrode. The treatment conditions and the physical properties of the obtained activated carbon are shown in Table 1.

Example 5

An activated carbon for a non-aqueous polarizable electrode was obtained in the same manner as that of Example 4 except that the temperature was raised stepwise under a nitrogen atmosphere at a temperature increase rate of 24° C./min to 600° C., at a temperature increase rate of 12° C./min to 900° C., and at a temperature increase rate of 1.67° C./min to 1100° C. and then kept at 1100° C. for 60 minutes to perform the heat treatment and that the fine pulverization and classification were carried out so as to have an average particle diameter of 5.97 μm with a content of 4.37 vol % for particles having a particle diameter of 2 μm or less. The treatment conditions and the physical properties of the obtained activated carbon are shown in Table 1.

Example 6

An activated carbon for a non-aqueous polarizable electrode was obtained in the same manner as that of Example 4 except that the temperature was raised stepwise under a nitrogen atmosphere at a temperature increase rate of 24° C./min to 600° C., at a temperature increase rate of 12° C./min to 900° C., and at a temperature increase rate of 1.67° C./min to 1200° C. and then kept at 1200° C. for 60 minutes to perform the heat treatment and that the fine pulverization and classification were carried out so as to have an average particle diameter of 5.93 μm with a content of 3.99 vol % for particles having a particle diameter of 2 μm or less. The treatment conditions and the physical properties of the obtained activated carbon are shown in Table 1.

Example 7

An activated carbon for a non-aqueous polarizable electrode was obtained in the same manner as that of Example 4 except that the temperature was raised stepwise under a nitrogen atmosphere at a temperature increase rate of 24° C./min to 600° C., at a temperature increase rate of 12° C./min to 900° C., and at a temperature increase rate of 1.67° C./min to 1300° C. and then kept at 1300° C. for 60 minutes to perform the heat treatment and that the fine pulverization and classification were carried out so as to have an average particle diameter of 5.87 μm with a content of 4.56 vol % for particles having a particle diameter of 2 μm or less. The treatment conditions and the physical properties of the obtained activated carbon are shown in Table 1.

Example 8

An activated carbon for a non-aqueous polarizable electrode was obtained in the same manner as that of Example 1 except that the fine pulverization and classification were carried out so as to have an average particle diameter of 3.94 μm with a content of 8.94 vol % for particles having a particle diameter of 2 μm or less. The treatment conditions and the physical properties of the obtained activated carbon are shown in Table 1.

Example 9

An activated carbon for a non-aqueous polarizable electrode was obtained in the same manner as that of Example 1 except that the fine pulverization was carried out so as to have an average particle diameter of 15.50 μm with a content of 6.09 vol % for particles having a particle diameter of 2 μm or less and then classification was carried out in a condition that only large particles having a particle diameter larger than 80 μm are removed. The treatment conditions and the physical properties of the obtained activated carbon are shown in Table 1.

Comparative Example 1

An activated carbon for a non-aqueous polarizable electrode was obtained in the same manner as that of Example 1 except that the fine pulverization and classification were carried out so as to have an average particle diameter of 5.89 μm with a content of 4.93 vol % for particles having a particle diameter of 2 μm or less and that the temperature was raised stepwise under a nitrogen atmosphere at a temperature increase rate of 24° C./min to 600° C. and at a temperature increase rate of 12° C./min to 800° C. and then kept at 800° C. for 60 minutes to perform the heat treatment. The treatment conditions and the physical properties of the obtained activated carbon are shown in Table 1.

Comparative Example 2

An activated carbon for a non-aqueous polarizable electrode was obtained in the same manner as that of Example 1 except that the fine pulverization and classification were carried out so as to have an average particle diameter of 5.79 μm with a content of 5.49 vol % for particles having a particle diameter of 2 μm or less and that the temperature was raised stepwise under a nitrogen atmosphere at a temperature increase rate of 24° C./min to 600° C. and at a temperature increase rate of 12° C./min to 700° C. and then kept at 700° C. for 60 minutes to perform the heat treatment. The treatment conditions and the physical properties of the obtained activated carbon are shown in Table 1.

Comparative Example 3

An activated carbon for a non-aqueous polarizable electrode was obtained in the same manner as that of Comparative Example 1 except that the fine pulverization was carried out so as to have an average particle diameter of 5.93 μm with a content of 9.64 vol % for particles having a particle diameter of 2 μm or less without classification. The treatment conditions and the physical properties of the obtained activated carbon are shown in Table 1.

Comparative Example 4

An activated carbon for a non-aqueous polarizable electrode was obtained in the same manner as that of Comparative Example 2 except that the fine pulverization was carried out so as to have an average particle diameter of 5.87 μm with a content of 10.56 vol % for particles having a particle diameter of 2 μm or less without classification. The treatment conditions and the physical properties of the obtained activated carbon are shown in Table 1.

Comparative Example 5

An activated carbon for a non-aqueous polarizable electrode was obtained in the same manner as that of Example 1 except that the fine pulverization was carried out so as to have an average particle diameter of 5.84 μm with a content of 11.89 vol % for particles having a particle diameter of 2 μm or less without classification and that the temperature was raised stepwise under a nitrogen atmosphere at a temperature increase rate of 24° C./min to 500° C. and then kept at 500° C. for 60 minutes to perform the heat treatment. The treatment conditions and the physical properties of the obtained activated carbon are shown in Table 1.

Comparative Example 6

An activated carbon for a non-aqueous polarizable electrode was obtained in the same manner as that of Example 1 except that the fine pulverization was carried out so as to have an average particle diameter of 5.81 μm with a content of 11.34 vol % for particles having a particle diameter of 2 μm or less without classification and heat treatment. The treatment conditions and the physical properties of the obtained activated carbon are shown in Table 1.

Comparative Example 7

An activated carbon for a non-aqueous polarizable electrode was obtained in the same manner as that of Example 1 except that the fine pulverization and classification were carried out so as to have an average particle diameter of 5.75 μm with a content of 6.47 vol % for particles having a particle diameter of 2 μm or less without heat treatment. The treatment conditions and the physical properties of the obtained activated carbon are shown in Table 1.

Comparative Example 8

An activated carbon for a non-aqueous polarizable electrode was obtained in the same manner as that of Example 4 except that the temperature was raised stepwise under a nitrogen atmosphere at a temperature increase rate of 24° C./min to 600° C., at a temperature increase rate of 12° C./min to 900° C., and at a temperature increase rate of 1.67° C./min to 1400° C. and then kept at 1400° C. for 60 minutes to perform the heat treatment and that the fine pulverization and classification were carried out so as to have an average particle diameter of 5.74 μm with a content of 4.66 vol % for particles having a particle diameter of 2 μm or less. The treatment conditions and the physical properties of the obtained activated carbon are shown in Table 1.

Comparative Example 9

An activated carbon for a non-aqueous polarizable electrode was obtained in the same manner as that of Example 1 except that the activation time was shortened to obtain the secondary-activated granular activated carbon having a specific surface area of 1571 m$^2$/g and an average pore diameter of 1.88 nm and that the fine pulverization and classification were carried out so as to have an average particle diameter of 5.83 μm with a content of 4.44 vol % for particles having a particle diameter of 2 μm or less. The treatment conditions and the physical properties of the obtained activated carbon are shown in Table 1.

Comparative Example 10

An activated carbon for a non-aqueous polarizable electrode was obtained in the same manner as that of Example 1 except that the activation time was extended to obtain the secondary-activated granular activated carbon having a specific surface area of 2283 m$^2$/g and an average pore diameter of 2.31 nm and that the fine pulverization and classification were carried out so as to have an average particle diameter of 5.99 μm with a content of 5.11 vol % for particles having a particle diameter of 2 μm or less. The treatment conditions and the physical properties of the obtained activated carbon are shown in Table 1.

narily dried under a reduced-pressure atmosphere (0.1 KPa or less) at 120° C. for 16 hours or more before use.

The activated carbon, the conductive auxiliary material, and the binder were weighed at a ratio of (mass of activated carbon):(mass of conductive auxiliary material):(mass of binder) of 81:9:10 and kneaded. Conductive carbon black

TABLE 1

| | classification process conditions | | | values of physical properties | | | | | | |
|---|---|---|---|---|---|---|---|---|---|---|
| | heat treatment process conditions | | average particle diameter | content rate for particle diameter of 2 μm or less | | specific surface area | intra-skeletal oxygen | surface oxygen | zeta potential (maximum value) | zeta potential difference | powder electrical conductivity |
| | atmosphere gas type | temperature (° C.) | (μm) | (vol %) | H/C | (m²/g) | (mass %) | (mass %) | (mV) | (mV) | (S/cm) |
| Example 1 | nitrogen | 1100 | 5.68 | 5.32 | 0.0022 | 1570 | 0.34 | 0.31 | 2.63 | 34.63 | 15.4 |
| Example 2 | nitrogen | 1000 | 5.83 | 4.33 | 0.0038 | 1624 | 0.32 | 0.31 | 7.63 | 42.64 | 11.8 |
| Example 3 | nitrogen | 900 | 5.89 | 4.06 | 0.0054 | 1662 | 0.61 | 0.23 | 12.91 | 57.22 | 9.1 |
| Example 4 | nitrogen | 1000 | 5.65 | 4.85 | 0.0051 | 1631 | 0.87 | 0.43 | 10.23 | 39.67 | 10.9 |
| Example 5 | nitrogen | 1100 | 5.97 | 4.37 | 0.0032 | 1582 | 0.83 | 0.45 | 8.61 | 35.26 | 13.3 |
| Example 6 | nitrogen | 1200 | 5.93 | 3.99 | 0.0016 | 1525 | 0.88 | 0.41 | 5.55 | 32.58 | 17.3 |
| Example 7 | nitrogen | 1300 | 5.87 | 4.56 | 0.0015 | 1458 | 0.76 | 0.37 | 2.13 | 28.63 | 20.6 |
| Example 8 | nitrogen | 1100 | 3.94 | 8.94 | 0.0024 | 1545 | 0.34 | 0.35 | 16.32 | 41.35 | 14.7 |
| Example 9 | nitrogen | 1100 | 15.50 | 6.09 | 0.0021 | 1577 | 0.29 | 0.30 | 5.13 | 23.99 | 16.9 |
| Comparative Example 1 | nitrogen | 800 | 5.89 | 4.93 | 0.0058 | 1694 | 0.75 | 0.22 | 13.64 | 45.69 | 7.5 |
| Comparative Example 2 | nitrogen | 700 | 5.79 | 5.49 | 0.0061 | 1693 | 0.93 | 0.27 | 13.37 | 54.93 | 7.3 |
| Comparative Example 3 | nitrogen | 800 | 5.93 | 9.64 | 0.0059 | 1735 | 0.96 | 0.26 | 18.79 | 55.43 | 7.3 |
| Comparative Example 4 | nitrogen | 700 | 5.87 | 10.56 | 0.0062 | 1729 | 1.04 | 0.28 | 15.97 | 52.56 | 7.1 |
| Comparative Example 5 | nitrogen | 500 | 5.84 | 11.89 | 0.0059 | 1711 | 0.99 | 0.43 | 11.34 | 50.29 | 7.1 |
| Comparative Example 6 | none | none | 5.81 | 11.34 | 0.0065 | 1720 | 1.22 | 0.50 | −3.63 | 42.26 | 6.7 |
| Comparative Example 7 | none | none | 5.75 | 6.47 | 0.0059 | 1682 | 1.17 | 0.49 | −2.51 | 24.80 | 6.6 |
| Comparative Example 8 | nitrogen | 1400 | 5.74 | 4.66 | 0.0013 | 1413 | 0.65 | 0.31 | −0.34 | 27.28 | 22.4 |
| Comparative Example 9 | nitrogen | 1100 | 5.83 | 4.44 | 0.0025 | 1369 | 0.32 | 0.29 | −9.41 | 17.77 | 7.3 |
| Comparative Example 10 | nitrogen | 1100 | 5.99 | 5.11 | 0.0020 | 2050 | 0.36 | 0.34 | 3.78 | 28.35 | 5.8 |

<Production of Electric Double Layer Aluminum Laminate Capacitor>

By using an activated carbon powder for a non-aqueous polarizable electrode prepared in each of Examples 1 to 9 and Comparative Examples 1 to 10, an electrode composition was obtained according to the following electrode production method, and a polarizable electrode was produced by using this composition. Furthermore, an electric double layer aluminum laminate capacitor was produced by using the polarizable electrode. In the obtained electric double layer aluminum laminated capacitor, electrostatic capacity, durability, resistance, and gas generation amount were measured and/or tested according to the following methods. The measurement results are shown in Table 2. Since the low temperature characteristic is an important property in the performance of the electric double layer capacitor, comparisons are made by using measurement results at −30° C. in Table 2.

1. Production of Test Electrodes

The activated carbon for a non-aqueous polarizable electrode prepared in each of Examples 1 to 9 and Comparative Examples 1 to 10, a conductive auxiliary material, and a binder used as electrode constituent members were preliminarily dried under a reduced-pressure atmosphere (0.1 KPa or less) at 120° C. for 16 hours or more before use.

"Denka Black Granule" manufactured by Denki Kagaku Kogyo was used as the conductive auxiliary material, and polytetrafluoroethylene "6J" manufactured by Mitsui-DuPont was used as the binder. To enhance uniformity, the kneaded product was cut into flakes of 1 mm square or less and subjected to a pressure of 400 kg/cm² by a coin molding machine to obtain a coin-shaped secondary molded product. The obtained secondary molded product was formed into a sheet shape having a thickness of 160 μm±5% by a roll press machine and then cut out into a predetermined size (30 mm×30 mm) to produce an electrode composition 1 as shown in FIG. 1. The obtained electrode composition 1 was dried at 120° C. under a reduced-pressure atmosphere for 16 hours or more. After that, mass, sheet thickness, and dimensions were measured and were then used for the following measurements.

2. Production of Measurement Electrode Cell

Figure 2:
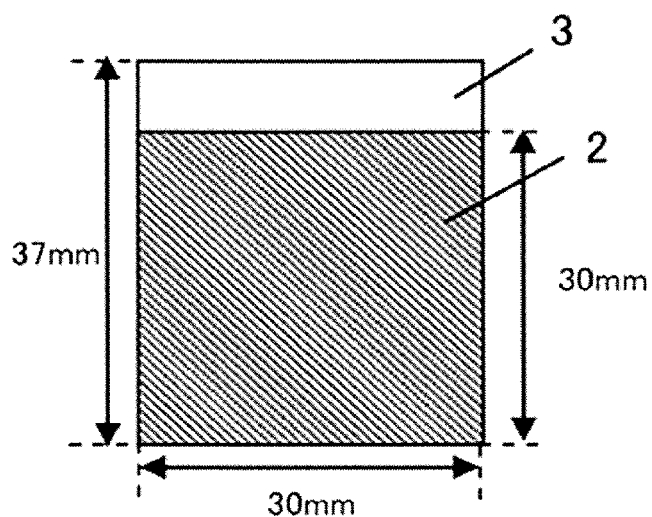
FIG. 2 is a view in which a conductive adhesive is applied to a current collector (etched aluminum foil).
Figure 3:
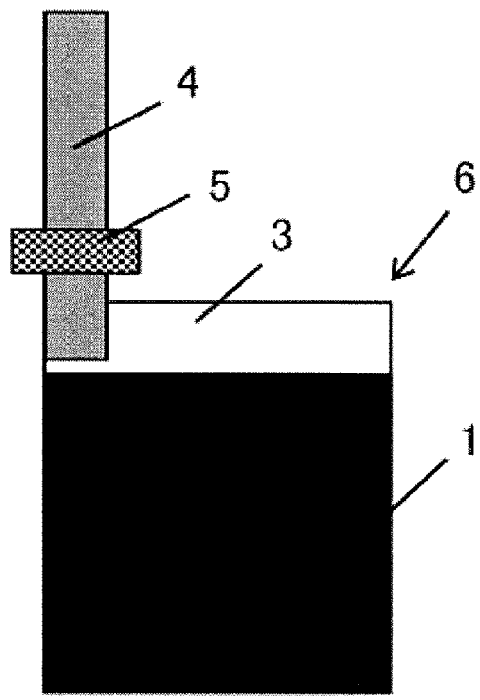
FIG. 3 is a view showing a polarizable electrode firmed by bonding the sheet-shaped electrode composition and the current collector and ultrasonically welding an aluminum tab.

As shown in FIG. 2, a conductive adhesive 2, "HITASOL GA-703" manufactured by Hitachi Chemical Company, was applied to an etched aluminum foil 3 manufactured by Hohsen Corp. to a coating thickness of 100 μm. As shown in FIG. 3, the etched aluminum foil 3 having the conductive adhesive 2 applied thereon was bonded to the sheet-shaped electrode composition 1 cut in advance. A tab 4 with aluminum sealant 5 manufactured by Hohsen Corp. was welded to the etched aluminum foil 3 by using an ultrasonic welding machine. After welding, the laminate was vacuum-dried at 120° C. to obtain a polarizable electrode 6 comprising an aluminum current collector.

Figure 4:
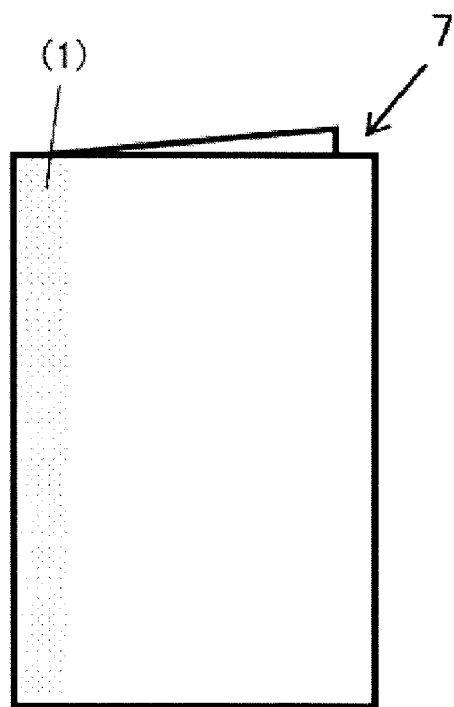
FIG. 4 is a view showing a bag-shaped exterior sheet.
Figure 5:
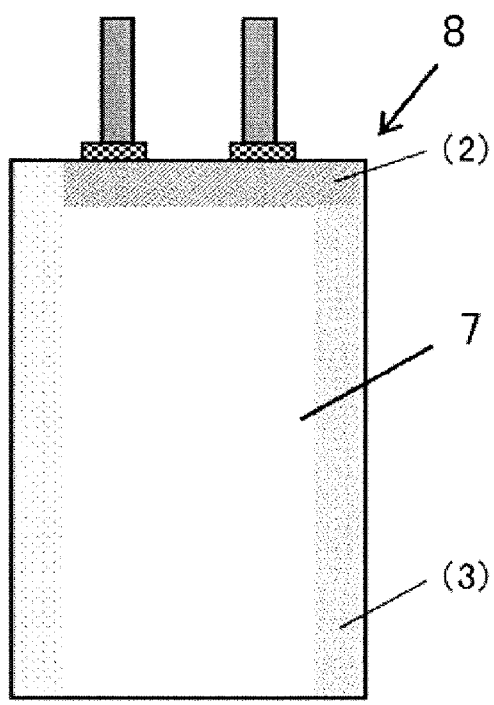
FIG. 5 is a view showing an electric double layer capacitor.

As shown in FIG. 4, an aluminum laminated resin sheet manufactured by Hohsen Corp. was cut into a rectangle (200 mm in length×60 mm in width) and folded in half to prepare a bag-shaped exterior sheet 7 in which one side was bonded by thermocompression ((1) in FIG. 4) and the remaining two sides were opened. Two of the polarizable electrodes 6 were overlapped with each other via a cellulose separator "TF-40" (not shown) manufactured by Nippon Kodoshi Corporation to produce a laminate. This laminate was inserted into the exterior sheet 7, and the polarizable electrodes 6 were fixed by thermocompression bonding of one side brought into contact with the tabs 4 ((2) in FIG. 5). After vacuum drying at 120° C. under a reduced-pressure atmosphere for 16 hours or more, an electrolytic solution was injected in a dry box of an argon atmosphere (dew point: −90° C. or less). A 1.5 mol/L triethylmethylammonium tetrafluoroborate propylene carbonate solution manufactured by Toyo Gosei Co., Ltd. was used as the electrolytic solution. After the laminate was impregnated with the electrolytic solution in the exterior sheet 7, the remaining one side ((3) in FIG. 5) of the exterior sheet 7 was bonded by thermocompression to produce an electric double layer capacitor 8 shown in FIG. 5.

<Electrostatic Capacity Measurement>

The obtained electric double layer capacitor 8 was charged by using "CAPACTITOR TESTER PFX2411" manufactured by Kikusui Electronics Corp. at a constant current of 200 mA per electrode surface area to an attained voltage of 3.0 V at 25° C. and −30° C., was further subjected to auxiliary charge at 3.0 V for 30 minutes under a constant voltage, and was discharged at 25 mA after completion of the auxiliary charge. An obtained discharge curve data was calculated by an energy conversion method and was defined as an electrostatic capacity (F). Specifically, the capacitor was discharged after charge until the voltage became zero, and the electrostatic capacity (F) was calculated from the discharge energy discharged in this case. An electrostatic capacity (F/g) divided by the mass of the activated carbon of the electrodes and an electrostatic capacity (F/cc) divided per electrode volume were obtained.

<Durability Test>

For the durability test, the electrostatic capacity measurement described above was followed by keeping the capacitor in a constant temperature bath at 60° C. for 400 hours while a voltage of 3.0 V was applied, and the electrostatic capacity measurement was then performed at 25° C. and −30° C. in the same way as that described above. From the electrostatic capacity before and after the durability test, the capacity retention rate was determined for each temperature according to the following equation. The phrase "before the durability test" means a timing after performing a running-in operation for 25 hours after starting the application of the voltage of 3.0 V in the constant temperature bath at 60° C., and the phrase "after the durability test" means a timing after keeping the capacitor for 400 hours.

capacity retention rate (%)=electrostatic capacity per mass of activated carbon after durability test/electrostatic capacity per mass of activated carbon before durability test×100

<Resistance Measurement>

The resistance measurement was performed with an electrochemical measurement device (VSP manufactured by BioLogic) at 25° C. and −30° C. by giving an amplitude width of 5 mV centering around 0 V according to a constant voltage AC impedance measurement method at a frequency of from 4 mHz to 1 MHz to obtain a Board-Plot indicative of a relationship between frequency and impedance. A difference in resistance at 1 Hz and 1000 Hz in this Plot was obtained as a resistance related to charge transfer (electrode reaction and ion adsorption/desorption), and a change in the resistance was compared.

<Gas Generation Amount Measurement>

An amount of generated gas was obtained by measuring a dry weight and a weight in water of a measured electrode cell, obtaining a cell volume from a generated buoyant force and the water density, and correcting a gas volume calculated from a change in cell volume before and after the durability test with a temperature difference at the time of measurement. That is, the gas generation amount was determined according to the following equation. In the equation, a cell weight A represents the cell weight (g) in air, and a cell weight W represents the cell weight (g) in water.

gas generation amount (cc)={(cell weight $A$ after durability test–cell weight $W$ after durability test)–(cell weight $A$ before the durability test $A$–cell weight $W$ before durability test)}/(273+measurement temperature (° C.) after durability test/(273+measurement temperature (° C.) before durability test)

A value obtained by further dividing the gas generation amount by the mass of the activated carbon constituting the electrode composition was defined as the gas generation amount per mass of the activated carbon (cc/g).

TABLE 2

| | gas generation amount (mL/g-activated carbon) | capacity retention rate (%) | resistance (Ω/mm) | electrostatic capacity (F/g activated carbon) | electrostatic capacity (F/cc) |
|---|---|---|---|---|---|
| Example 1 | 8.7 | 85.5 | 9.2 | 22.3 | 11.5 |
| Example 2 | 9.3 | 85.6 | 8.5 | 22.9 | 11.6 |
| Example 3 | 12.0 | 85.6 | 7.2 | 23.7 | 11.7 |
| Example 4 | 11.4 | 83.4 | 8.7 | 21.8 | 11.5 |
| Example 5 | 11.4 | 84.9 | 9.2 | 22.7 | 12.1 |
| Example 6 | 8.6 | 84.9 | 10.5 | 21.3 | 11.8 |
| Example 7 | 8.1 | 83.9 | 11.9 | 18.5 | 10.4 |
| Example 8 | 10.2 | 83.0 | 11.9 | 22.3 | 11.9 |
| Example 9 | 9.9 | 83.6 | 9.6 | 22.6 | 12.0 |
| Comparative Example 1 | 16.6 | 81.8 | 8.5 | 23.1 | 11.0 |
| Comparative Example 2 | 18.9 | 77.9 | 11.5 | 22.1 | 11.4 |
| Comparative Example 3 | 13.7 | 82.7 | 10.2 | 23.6 | 11.7 |
| Comparative Example 4 | 19.4 | 76.2 | 15.0 | 21.7 | 10.6 |
| Comparative Example 5 | 19.2 | 71.5 | 15.9 | 20.5 | 10.1 |
| Comparative Example 6 | 22.1 | 65.6 | 18.3 | 18.7 | 9.4 |
| Comparative Example 7 | 17.6 | 78.5 | 10.2 | 22.3 | 11.1 |
| Comparative Example 8 | 5.8 | 80.6 | 13.0 | 15.6 | 8.9 |
| Comparative Example 9 | 13.7 | 85.4 | 12.3 | 22.4 | 12.5 |
| Comparative Example 10 | 11.3 | 83.6 | 9.9 | 25.5 | 9.8 |

When the modified activated carbon obtained in Examples 1 to 9 was used, an electric double layer capacitor having a reduced gas generation amount and a high capacity retention rate was obtained. On the other hand, by using the activated carbon obtained in Comparative Examples 1 to 10 having a large intra-skeletal oxygen amount and/or a high hydrogen content/carbon content or a specific surface area outside the range defined in the present invention, the gas generation amount was increased and the capacity retention rate was reduced.

EXPLANATIONS OF LETTERS OR NUMERALS 1 electrode composition
2 conductive adhesive
3 etched aluminum foil
4 tab
5 sealant
6 polarizable electrode
7 bag-shaped exterior sheet
8 electric double layer capacitor
(1) one side bonded by thermocompression
(2) one side brought into contact with tabs
(3) remaining one side of bag-shaped exterior sheet

The invention claimed is:

1. A coconut shell-derived modified activated carbon having a BET specific surface area of 1400 to 2000 m$^2$/g, a value of hydrogen content/carbon content of from 0.0015 to 0.0055, and intra-skeletal oxygen of 0.9 mass % or less, wherein a content of particles having a particle diameter of 2 μm or less is 9 vol % or less.

2. The modified activated carbon according to claim 1, wherein an average particle diameter is from 3.5 μm to 16 μm.

3. The modified activated carbon according to claim 1, wherein a zeta potential difference is from 30 mV to 100 mV, and a maximum value of zeta potential is 0 mV or more.

4. The modified activated carbon according to claim 1, wherein an electrical conductivity determined by powder resistance measurement at a load of 12 kN is 9 S/cm or more.

5. A method for producing the modified activated carbon according to claim 1, the method comprising in random order:
  acid-washing a coconut shell-derived activated carbon;
  pulverizing a coconut shell-derived activated carbon to an average particle diameter of from 3.5 μm to 16 μm;
  classifying a coconut shell-derived activated carbon to achieve a content rate of 9 vol % or less for particles having a particle diameter of 2 μm or less; and
  heat-treating a coconut shell-derived activated carbon at 900° C. to 1300° C. under an inert gas atmosphere.

6. The method according to claim 5, further comprising:
  deacidification under an oxidizing gas atmosphere at 500° C. to 1000° C. after the acid washing.

7. A non-aqueous polarizable electrode, comprising: the modified activated carbon according to claim 1.

8. An electric double layer capacitor, comprising: the non-aqueous polarizable electrode according to claim 7.

9. A coconut shell-derived modified activated carbon having a BET specific surface area of 1400 to 2000 m$^2$/g, a value of hydrogen content/carbon content of from 0.0015 to 0.0055, and intra-skeletal oxygen of 0.9 mass % or less, wherein a zeta potential difference is from 30 mV to 100 mV, and a maximum value of zeta potential is 0 mV or more.

10. The modified activated carbon according to claim 9, wherein an average particle diameter is from 3.5 μm to 16 μm.

11. The modified activated carbon according to claim 9, wherein an electrical conductivity determined by powder resistance measurement at a load of 12 kN is 9 S/cm or more.

12. A method for producing the modified activated carbon of claim 9, the method comprising in random order:
  acid-washing a coconut shell-derived activated carbon;
  pulverizing a coconut shell-derived activated carbon to an average particle diameter of from 3.5 μm to 16 μm;
  classifying a coconut shell-derived activated carbon to achieve a content rate of 9 vol % or less for particles having a particle diameter of 2 μm or less; and
  heat-treating a coconut shell-derived activated carbon at 900° C. to 1300° C. under an inert gas atmosphere.

13. The method according to claim 12, further comprising:
  deacidification under an oxidizing gas atmosphere at 500° C. to 1000° C. after the acid washing.

14. A non-aqueous polarizable electrode, comprising: the modified activated carbon according to claim 9.

15. An electric double layer capacitor, comprising: the non-aqueous polarizable electrode according to claim 14.

* * * * *